United States Patent [19]
Suzuki et al.

[11] Patent Number: 5,627,352
[45] Date of Patent: May 6, 1997

[54] STEERING WHEEL

[75] Inventors: Kazumasa Suzuki, Ogaki; Yoshiyuki Fujita; Motoi Isomura, both of Nagoya, all of Japan

[73] Assignee: Toyoda Gosei Co., Ltd., Nishikasugai-gun, Japan

[21] Appl. No.: 532,269

[22] Filed: Sep. 22, 1995

[30] Foreign Application Priority Data

Sep. 28, 1994 [JP] Japan ................................. 6-233391
Mar. 22, 1995 [JP] Japan ................................. 7-062778

[51] Int. Cl.$^6$ .............................. H01H 9/00; B60R 21/00; B62D 1/04
[52] U.S. Cl. ........................... 200/61.54; 200/61.55
[58] Field of Search ............... 74/552; 200/61.54–61.57

[56] References Cited

U.S. PATENT DOCUMENTS

| | | | |
|---|---|---|---|
| 3,517,145 | 6/1970 | Wallace | 200/61.55 |
| 3,589,210 | 6/1971 | Norman | 74/552 |
| 4,789,763 | 12/1988 | Nagata et al. | 200/61.54 |
| 4,872,364 | 10/1989 | Kaga et al. | 74/484 H |
| 5,001,311 | 3/1991 | Sakane | 200/61.54 |
| 5,067,367 | 11/1991 | Hashiba et al. | 74/552 |
| 5,222,415 | 6/1993 | Fujita et al. | 74/552 |
| 5,235,146 | 8/1993 | Suzuki | 200/61.54 |
| 5,239,147 | 8/1993 | Allard et al. | 200/61.54 |
| 5,327,796 | 7/1994 | Ernst et al. | 74/484 H |
| 5,410,114 | 4/1995 | Furuie et al. | 200/61.55 |

FOREIGN PATENT DOCUMENTS

| | | | |
|---|---|---|---|
| 0390029A3 | 10/1990 | European Pat. Off. | B60R 16/00 |
| 1471447 | 3/1967 | France . | |
| 2740986 | 3/1979 | Germany | B60Q 1/46 |
| 5-139318 | 6/1993 | Japan | B62D 1/04 |

OTHER PUBLICATIONS

Search Report, Jan. 29, 1996.

*Primary Examiner*—Cassandra C. Spyrou
*Assistant Examiner*—Michael A. Friedhofer
*Attorney, Agent, or Firm*—Cushman Darby & Cushman IP Group of Pillsbury Madison & Sutro LLP

[57] ABSTRACT

A plurality of horn switches are provided between a steering wheel body and a horn pad provided above the steering wheel body. Each of the horn switches includes a spacer having an insulating property, a horn spring which is connected to a positive electrode of a horn operating circuit and urges the horn pad upwardly, a tongue connected to a negative electrode of the horn operating circuit, and a shearable shoulder bolt. The horn spring and the tongue are mounted on the spacer. The spacer has a tubular portion having an enlarged portion formed on an outer peripheral surface thereof at a distal end thereof. The tubular portion is retained in a retaining hole in the steering wheel body. The shoulder bolt is inserted into the tubular portion from an end thereof opposite to the horn pad, and is screw-mounted to the horn pad.

9 Claims, 8 Drawing Sheets

STEERING WHEEL

FIELD OF THE INVENTION AND RELATED ART STATEMENT

This invention relates generally to a steering wheel for a vehicle, and more particularly to a steering wheel of the type in which a plurality of horn switches are provided between a steering wheel body and a horn pad disposed above the steering wheel body.

A steering wheel of this type is disclosed in Japanese Patent Unexamined Publication No. 5-139318.

In such a conventional steering wheel, there are a large number of constituent parts of the horn switch, and, therefore, much time and labor have been required for the manufacture and the management of these component parts.

Also, conventional steering wheels employ a construction such that the constituent parts of the horn switch are arranged in a distributed manner so that a large space is required for mounting the horn switch. As a result, the freedom of arrangement of other function parts within the steering wheel has been limited, and the space below a horn pad could not be utilized efficiently.

OBJECT AND SUMMARY OF THE INVENTION

With the above problems in view, it is an object of this invention to provide a steering wheel of the type in which the number of constituent parts of a horn switch can be reduced, and more compactly mounted.

According to the present invention, the steering wheel includes a steering wheel body provided with a retaining hole and a horn pad provided above the steering wheel body.

A plurality of horn switches are also provided between the horn pad and the steering wheel body, with each of the horn switches including an insulating spacer having an enlarged tubular portion formed on an outer peripheral surface thereof and at a distal end. The tubular portion is retained in a retaining hole in the steering wheel body.

Each horn switch also includes a horn spring electrically connected to one electrode of a horn operating circuit and in contact with the back surface of a horn pad to urge the horn pad upwardly, and a tongue, electrically connected to the other electrode of the horn operating circuit and having a contact portion disposed beneath the contact portion of the horn spring. The horn spring and the tongue are mounted on the spacer in an insulated manner. Also included is a shoulder bolt screw-mounted to the horn pad, the shoulder bolt including a shank which passes through and is larger than the tubular portion of the spacer. In particular, the bolt includes an externally-threaded portion, which extends from a one end of the shank, that is screw-mounted to the horn pad, and a head, provided at the other end of the shank, that has a diameter larger than an inner diameter of the tubular portion of the spacer. The shoulder bolt is inserted into the tubular portion of the spacer from an end thereof opposite the horn pad and as noted is screw mounted to the horn pad.

Other objects, features, and characteristics of the present invention will become apparent upon consideration of the following description in the appended claims with reference to the accompanying drawings, all of which form a part of the specification, and wherein referenced numerals designate corresponding parts in the various figures.

DETAILED DESCRIPTION OF THE PREFERRED EMBODIMENTS

Figure 1:
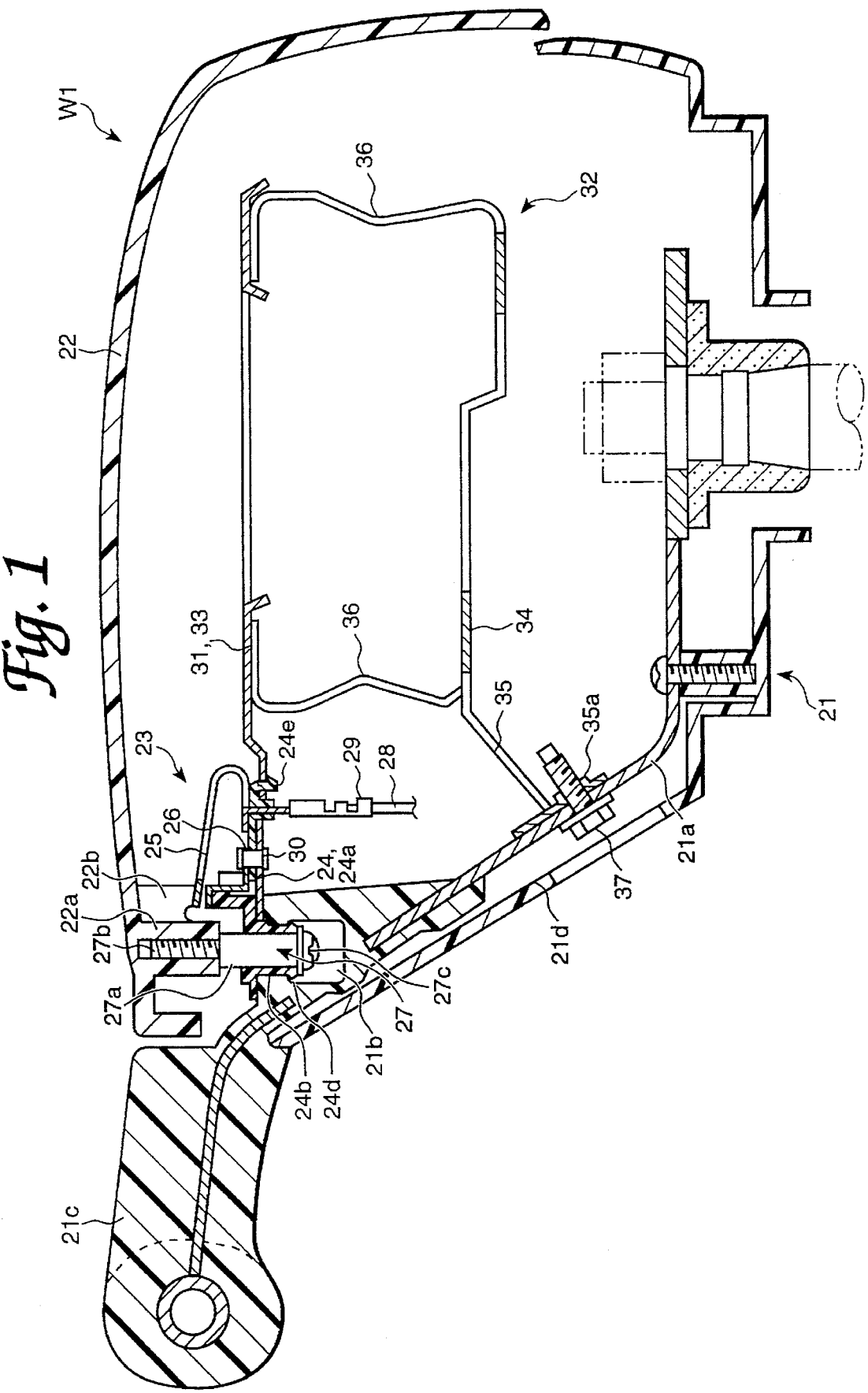
FIG. 1 is a cross-sectional view of one preferred embodiment of a steering wheel of the present invention.
Figure 2:
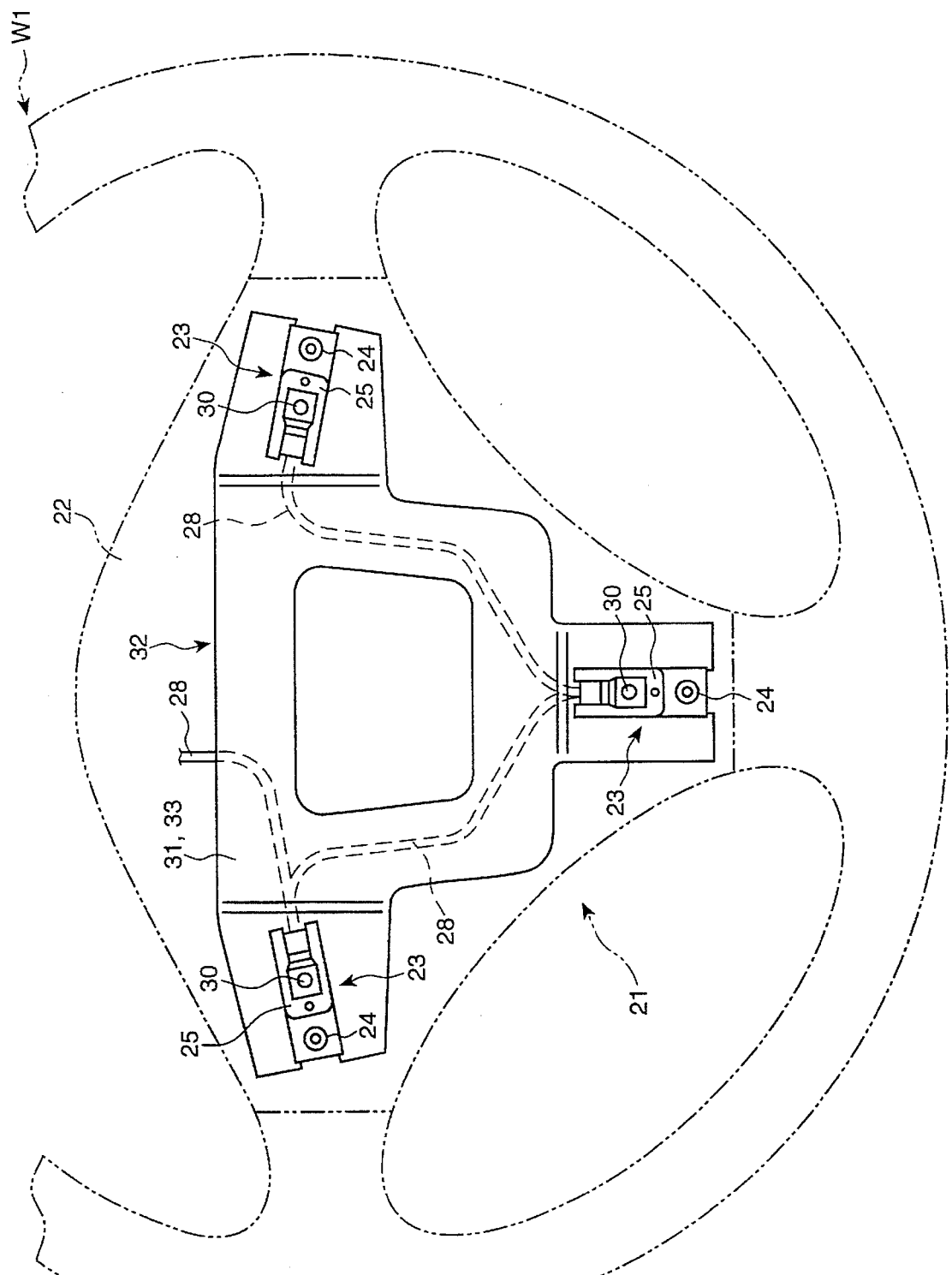
FIG. 2 is a plan view of the steering wheel shown in FIG. 1.

A preferred embodiment of a steering wheel W1 of the present invention, as shown in FIGS. 1 and 2, includes three horn switches 23 located between a steering wheel body 21 and a horn pad 22. Here, the steering wheel body 21 includes those constituent portions of the steering wheel W1 except for the horn pad 22, the horn switches 23 and an impact energy absorber 32 (described later). In this embodiment, the steering wheel body 21 comprises a metal core member 21a (described later), a covering layer 21c of a soft synthetic resin, such as urethane, covering part of the metal core member 21a and having a retaining hole 21b, and a lower cover 21d.

Figure 3:
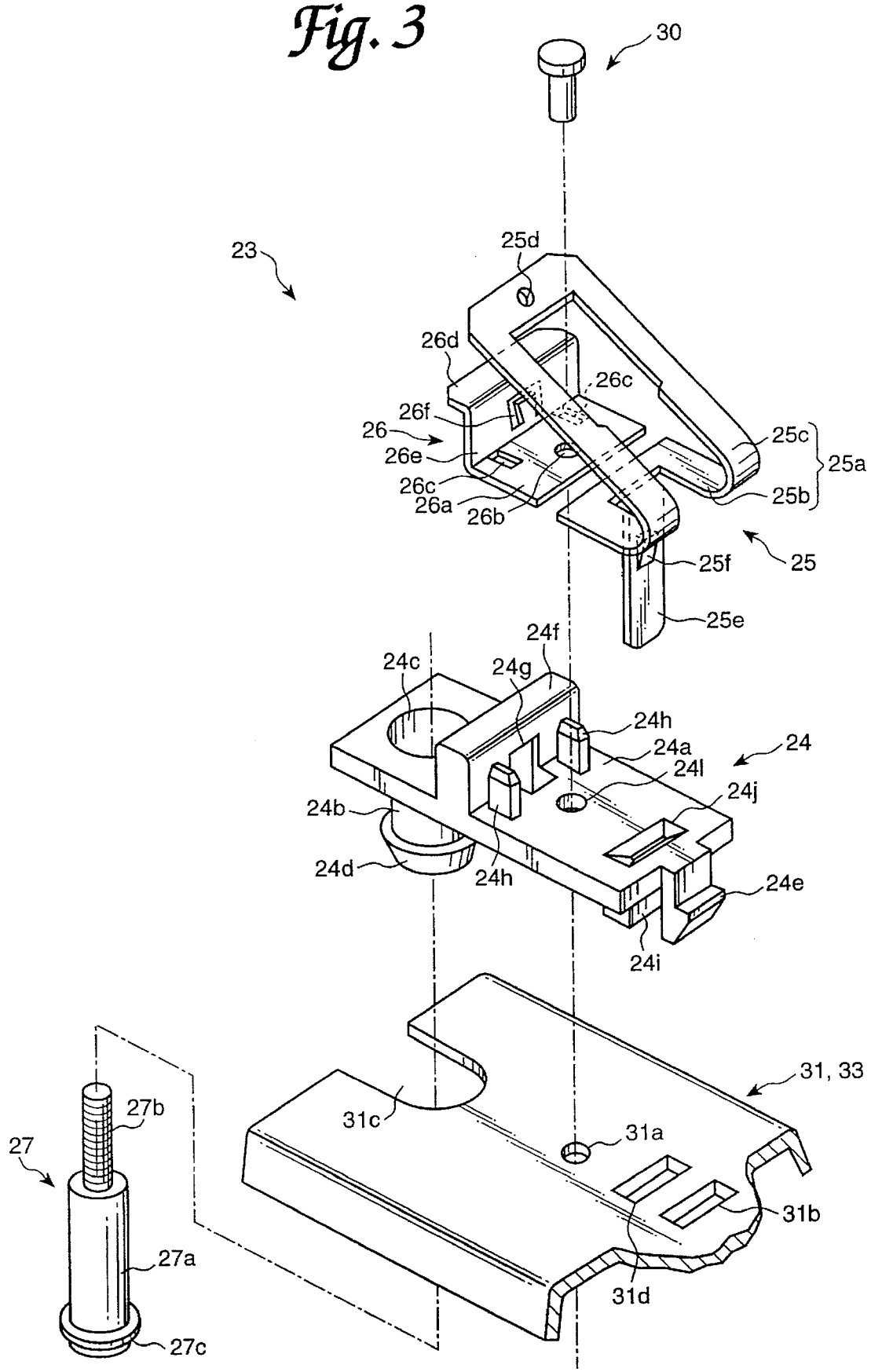
FIG. 3 is an exploded, perspective view of a horn switch of the steering wheel shown in FIG. 1.
Figure 4:
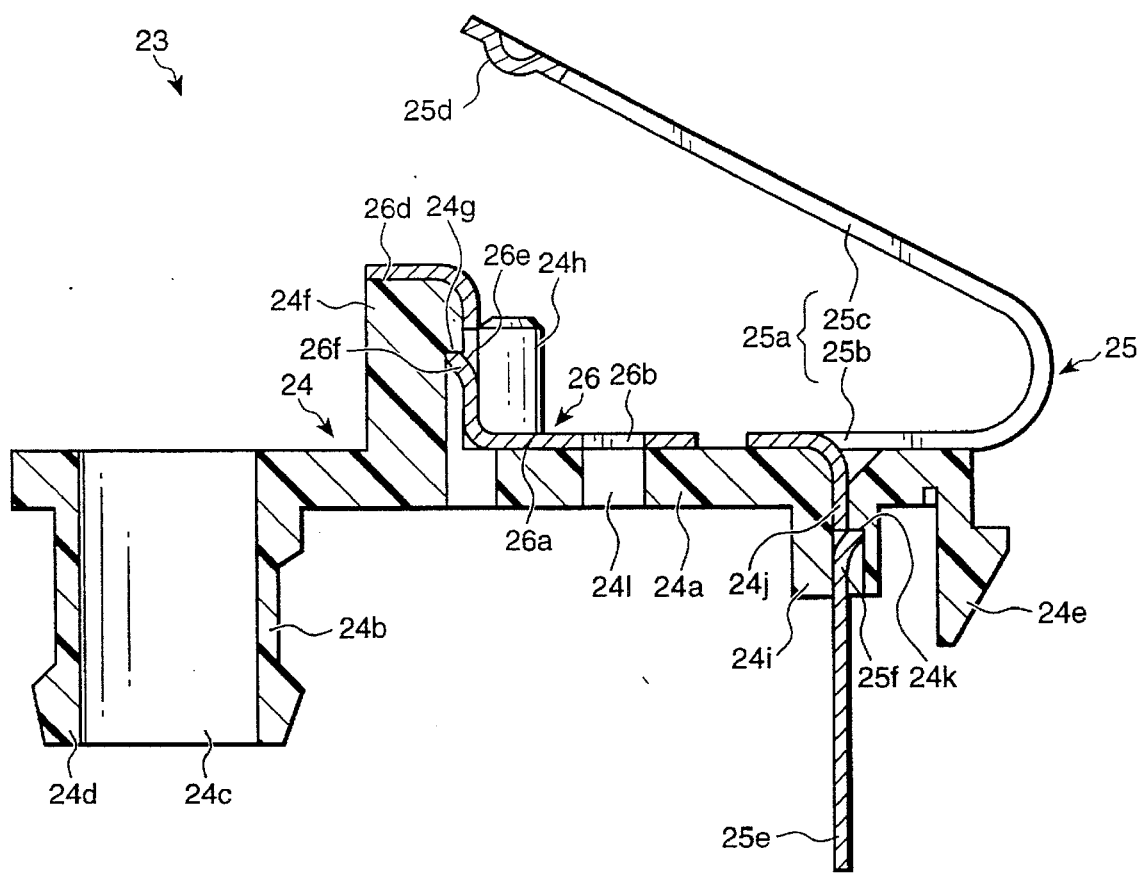
FIG. 4 is an enlarged, cross-sectional view of the horn switch shown in FIG. 1.

As shown in detail in FIGS. 2 to 4, each of the horn switches 23 comprises a spacer 24 having an insulating property, a horn spring 25 electrically connected to a positive electrode of a horn operating circuit, a tongue 26 for grounding purposes electrically connected to a negative electrode of the horn operating circuit, and a stepped shoulder belt 27.

One horn switch 23 will now be described in detail. The other ones have a similar construction, and therefore explanation thereof will be omitted. The spacer 24 in the horn switch 23 is made of a synthetic resin such as polyacetal, and includes a base plate 24a extending horizontally, a cylindrical tubular portion 24b formed at one end of the base plate 24a, and a retaining leg 24e formed at the other end of the base plate 24a and extending downwardly therefrom. The tubular portion 24b has an insertion hole or bore 24c extending vertically therethrough, and also has an annular convex portion 24d formed on the lower end of an outer periphery thereof. A mounting projection 24f, having a step surface 24g, extends upwardly from the base portion 24a adjacent the tubular portion 24b. A pair of limiting projections 24h extend upwardly from the base plate 24a adjacent the mounting projection 24f, and are disposed on opposite sides of the base plate 24a, respectively. A mounting portion 24i, having a rectangular cross-section, extends downwardly from the bottom of base plate 24a adjacent the retaining leg 24e, and has an insertion hole 24j extending vertically therethrough. A step surface or shoulder 24k, shown in FIG. 4, is formed on the inner surface of the insertion hole 24j intermediate opposite ends thereof. A hole 24l is formed vertically through a central portion of the base plate 24a. The retaining leg 24e serves to provisionally retain the spacer 24 on a base plate 31 (described later), and is formed into such a narrow shape that it can be easily broken upon reception of an impact force as will be described later. The horn spring 25 is made of spring steel, and includes a body 25a of a generally U-shape having a base portion 25b extending horizontally and a contact portion 25c extending obliquely upwardly from one end of the base portion 25b. A mounting piece portion 25e extends downwardly from the body 25a. A recessed portion serving as a contact 25d is formed at an upper end portion of the contact portion 25c, and a pawl 25f is formed on the mounting piece portion 25e intermediate upper and lower ends thereof.

A projection piece 22b, shown in FIG. 1, is provided on the back surface of the horn pad 22 and is adapted to be abutted against the upper surface of the horn spring 25 in the vicinity of the contact 25d.

The horn spring 25 is mounted on the base plate 24a of the spacer 24 by inserting the mounting piece portion 25e into the insertion hole 24j in the mounting portion 24i so that the pawl 25f is retainingly engaged with the step surface 24k. A terminal 29 having a lead wire 28 connected thereto is connected to the lower end portion of the mounting piece portion 25e to thereby electrically connect the horn spring 25 to the positive electrode of the horn operating circuit.

The tongue 26 is made of spring steel, and includes a pair of horizontally-extending lower and upper plate portions 26a and 26d, and a vertical plate portion 26e interconnecting the lower and upper plate portions 26a and 26d. The upper plate portion 26d serves as a contact for cooperating with the contact portion 25c of the horn spring 25. A through hole 26b is formed in a generally central portion of the lower plate portion 26a, and a pair of through holes 26c are formed in opposite (right and left) side portions of the lower plate portion 26a adjacent to the vertical plate portion 26e. A pawl 26f is formed on the vertical plate portion 26e.

The tongue 26 is mounted on the base plate 24a of the spacer 24 by passing each of the limiting projections 24h and 24h of the spacer base plate 24a respectively through one of the through holes 26c and 26c in the lower plate portion 26a and by retainingly engaging the pawl 26f of the vertical portion 26e with the step surface 24g of the mounting projection 24f. In this embodiment, the tongue 26 is fixedly secured to the base plate 31 by a rivet 30 passing through the through hole 26b and the through hole 241 (formed in the spacer 24) aligned with each other, so that the tongue 26 is electrically connected to the negative electrode of the horn operating circuit via the rivet 30 and the base plate 31 (impact energy absorber 32 described later).

In this embodiment, the rivet 30 is made of a metal material (e.g. aluminum) that can be sheared.

The base plate 31 in this embodiment constitutes an upper plate portion 33 of the impact energy absorber 32 made of a metal sheet. The impact energy absorber 32 includes the upper plate portion 33 (base plate 31), a lower plate portion 34, and a deformation portion 36 interconnecting the upper and lower plate portions 33 and 34. The deformation portion 36 can be buckled and deformed to absorb impact energy.

At each of the three portions of the base plate 31 where each of the three horn switches 23 are respectively mounted, a through hole 31a is formed for the rivet 30, along with a retaining hole 31b for retainingly receiving the retaining leg 24e of the spacer 24 to provisionally retain the spacer 24 on the base plate 31, an opening 31c for the tubular portion 24b of the spacer 24, and an insertion hole 31d for the mounting tubular portion 24i of the spacer 24.

A mounting piece 35, comprised of a metal sheet having an internally-threaded portion 35a secured thereto, is formed on the lower plate portion 34 of the impact energy absorber 32. The mounting piece 35 is secured to the metal core member 21a of the steering wheel body 21 by a bolt 37 which passes through the core metal member 21a from a reverse side thereof, and is screw-mounted to the internally-threaded portion 35a. Thus, the impact energy absorber 32 is electrically connected to the core metal member 21a serving as the negative (grounding) side of the horn operating circuit. The bolts 37 prevent the impact energy absorber 32 from being disengaged from the steering wheel body 21. The shoulder bolt 27 includes a shank 27a, an externally-threaded portion 27b, and a head 27c. The shank 27a is longer than the tubular portion 24b, and passes through the tubular portion 24b of the spacer 24. The externally-threaded portion 27b extends upwardly from one end of the shank 27a, and is screw-mounted into a boss 22a provided on the horn pad 22. The head 27c is formed at the other end of the shank 27a. The diameter of the head 27c is larger than an inner diameter of the insertion hole 24c of tubular portion 24b, but is smaller than the outer diameter of the convex portion 24d. The length of that portion of the shank 27a projecting outwardly from the tubular portion 24b, that is, the difference in length between the axial length of shank 27a and the axial length of tubular portion 24b, is longer than a horn stroke, that is, the distance by which the contact portion 25c, specifically the contact 25d, of the horn spring 25 would be brought into contact with the contact portion 26d when the horn pad 22 is pressed down for operating the horn.

In the steering wheel W1 of this embodiment, the horn spring 25 and the tongue 26 are held on the associated spacer 24 through their respective pawls 25f and 26f as described above. Then, the mounting portion 24i of the spacer 24 is inserted into the hole 31d, and also the retaining leg 24e is engaged in the hole 31b, thereby provisionally retaining the spacer 24 on the base plate 31 of the impact energy absorber 32. Then, the spacer 24 is secured to the base plate 31 by the rivet 30, and the lead wire 28 is connected to the mounting piece portion 25e of the horn spring 25 through the terminal 29.

Thereafter, the externally-threaded portion 27b of the shoulder bolt 27 is screwed into the associated boss 22a of the horn pad 22 through the insertion hole 24c in the tubular portion 24b from the lower side thereof. In this manner, the three horn switches 23 and one impact energy absorber 32 are attached to the horn pad 22. When each horn switch 23 is fastened to the horn pad 22 by the bolt 27, the projection 22b projecting downwardly from the horn pad 22 is abutted against an upper surface of the horn spring 25 in the vicinity of the contact 25d.

Thereafter, each lead wire 28 is connected to a slip ring (not shown) of the steering wheel body 21, and the tubular portion 24b of each spacer 24 is inserted into the associated retaining hole 21b in the steering wheel body 21, and each bolt 37 is screwed to the internally-threaded portion 35a of the associated mounting piece 35 of the impact energy absorber 32. In this manner, the horn pad 22, the horn switches 23 and the impact energy absorber 32 are attached to the steering wheel body 21, thus completing the assembling of the steering wheel W1. Preferably, the steering wheel body 21 has been mounted on a steering shaft (not shown) mounted on the vehicle.

As can perhaps be best seen in FIG. 1, when the horn pad 22 is depressed after the steering wheel W1 is thus mounted on the vehicle, the shank 27a of the shoulder bolt 27 is moved along and relative to the insertion hole 24c in the tubular portion 24b. The head 27c is also moved downward along the retaining hole 21b in the steering wheel body 21. The body 25a of the horn spring 25 is bent by the projection 22b of the horn pad 22, so that the contact 25d of the contact portion 25c comes into contact with the contact portion 26d of the associated tongue 26, thereby operating the horn.

Then, when the hand is disengaged from the horn pad 22 to stop the depressing operation, the horn pad 22 is moved upward by the resilient force of the body 25a of horn spring 25, so that the head 27c of the shoulder bolt 27 is again brought into engagement with the bottom peripheral edge of the convex portion 24d of the tubular portion 24b to limit the upward movement of the horn pad 22, thus restoring the horn pad 22 into its initial position. In the steering wheel W1 of this embodiment, each spacer 24 holds the associated horn spring 25 and tongue 26 in an insulated manner and mounts them onto the steering wheel body 21 through the tubular portion 24b. The shoulder bolt 27 also passes through the tubular portion 24b of the spacer 24 to hold the horn pad 22, and guides the downward movement of the horn pad 22.

Figure 5:
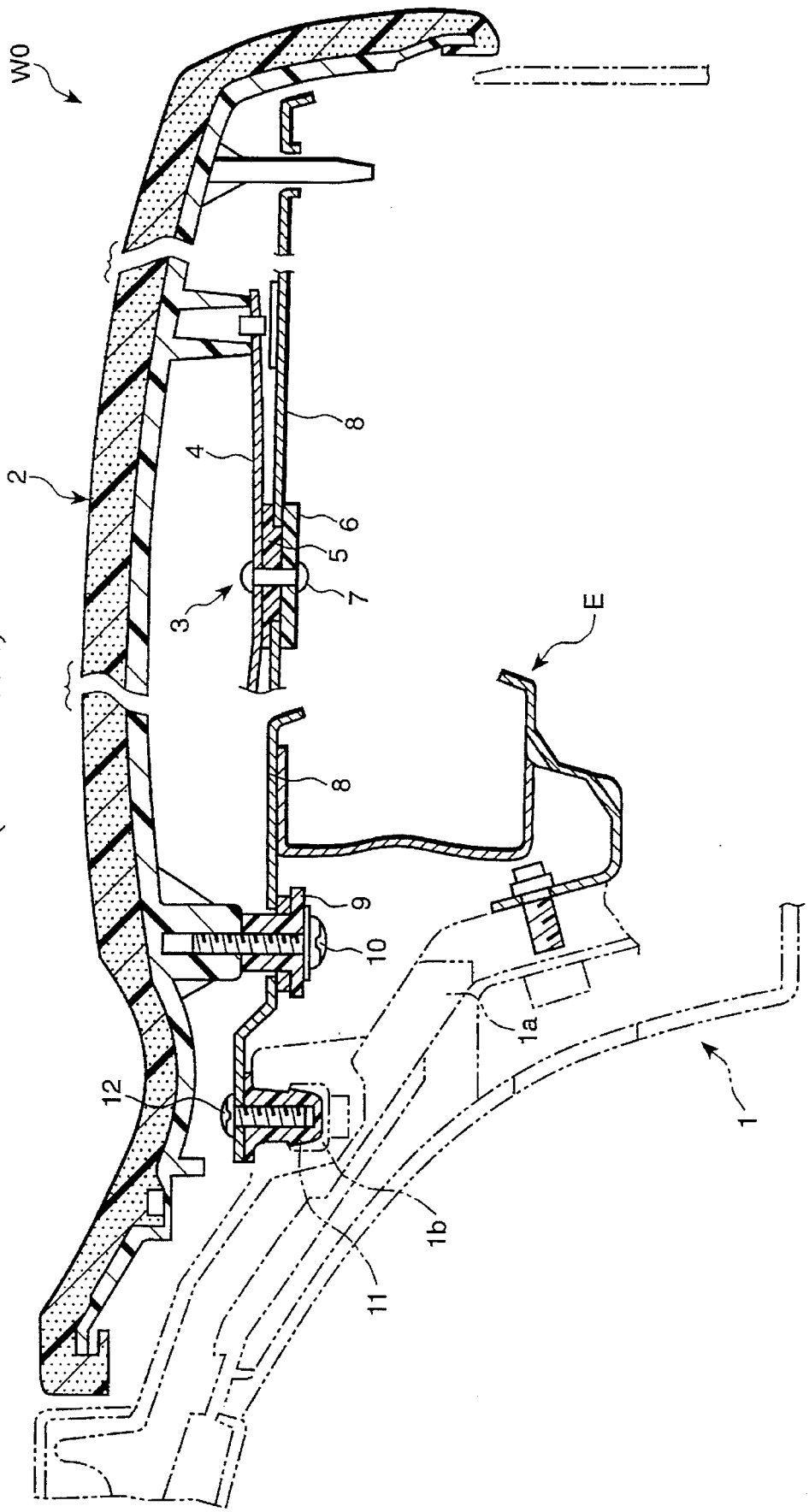
FIG. 5 is a cross-sectional view of a conventional steering wheel.

On the other hand, in a conventional steering wheel W0 shown in FIG. 5, each of horn switches 3 provided between a steering wheel body 1 and the horn pad 2 comprises nine component parts, that is, a horn spring 4, insulating spacers 5 and 6, a rivet 7, a base plate 8, a guide spacer 9, a screw 10, a mounting piece 11, and a screw 12.

The horn spring 4 is attached to the base plate 8 by the rivet 7 through the insulating spacers 5 and 6, and urges the horn pad 2 upwardly. The horn spring 4 is electrically connected to a positive electrode of a horn operating circuit via the rivet 7. The base plate 8 constitutes an upper portion of an impact energy absorber E formed of a metal sheet, and is electrically connected to a negative electrode of the horn operating circuit via a core metal member 1a of the steering wheel body 1.

The guide spacer 9 is attached to a back surface of the horn pad 2 by the screw 10 passing through the base plate 8 from the lower side thereof, and guides the downward movement of the horn pad 2 when the horn is operated. The guide spacer 9 also prevents the horn pad 2 from being disengaged from the base plate 8. The mounting piece 11 is attached to a back surface of the base plate 8 by the screw 12, and is inserted and retained in a retaining hole 1b in the steering wheel body 1. The mounting piece 11 connects the horn spring 4 of the horn switch 3 mounted on the base plate 8, as well as the horn pad 2, to the steering wheel body 1.

The number of the component parts of the conventional horn switch 3 is nine as described above whereas the horn switch of this embodiment comprises six component parts, that is, the spacer 24, the horn spring 25, the tongue 26, the shoulder bolt 27, the rivet 30 and the base plate 31.

In the present invention, where the base plate 31 is not used, the rivet 30 also does not need to be used, and therefore the number of the component parts is reduced to four, that is, the spacer 24, the horn spring 25, the tongue 26 and the shoulder bolt 27. Even where the base plate 31 is not used, the horn switch 23 can achieve its function without any inconvenience if a predetermined lead wire is connected to the tongue 26, since the base plate 24a of the spacer 24 is secured to a peripheral edge of the retaining hole 21b in the steering wheel body 21 through the tubular portion 24b.

In the steering wheel W1 of this embodiment, the horn spring 25 and the tongue 26 are mounted on the same spacer 24, and the shoulder bolt 27, which holds the horn pad 22, and guides the downward movement of the horn pad 22, is received in the spacer 24. Thus, the functions of the horn switch 23 are provided in a concentrated manner, and the horn switch 23 can itself have a compact construction.

The spacer 24 performs the function of insulating spacers 5 and 6 of a conventional construction, and also performs the function of the mounting piece 11. Further, the shoulder bolt 27 performs the function of holding a conventional horn pad (i.e., the function of the screw 10), and also performs the function of the guide spacer 9. Therefore, in the steering wheel W1 of this embodiment, the number and kinds of constituent or component parts is reduced.

In the steering wheel W1 of this embodiment, the reduced parts allows the horn switch 23 to be arranged in a compact manner, so that space below the horn pad 22 can be efficiently utilized. In this embodiment, the body 25a of each of the horn springs 25 urging the horn pad 22 upwardly has a recumbent U-shape, and therefore unlike the conventional horn switch 4, the horn switch 23 can be compact in configuration as viewed from above it, and therefore the spacer 24 holding the horn spring 25 mounted thereon can also be compact in configuration as viewed from above it, so that the horn switch 23 can be of a more compact construction.

The spacers 24 are designed to be mounted on the large base plate 31 of a metal sheet, and the base plate 31 is designed to serve as part of the circuit leading to the negative electrode of the horn operating circuit, in this embodiment. In this case, when the plurality of horn switches 23 are to be mounted on the steering wheel W1, all of the spacers 24 can be mounted on the base plate 31. With this construction, the mounting operations, such as screw-mounting of shoulder bolt 27 to the horn pad 22 through the tubular portion 24b of the associated spacer 24, and the insertion of the tubular portion 24b of each spacer 24 into the associated retaining hole 21b in the steering wheel body 21, can be carried out smoothly since the displacement of the tubular portion 24b of each spacer 24 out of position can be prevented by the base plate 31 of a metal sheet having a certain degree of shape retention nature. Further, since all of the horn switches 23 are electrically connected to the negative electrode of the horn operating circuit by the common member, that is, by base plate 31, time and labor for wiring can both be saved.

Where the impact energy absorber 32 incorporates therein the base plate 31, as in this embodiment, there is no need to provide a separate base plate.

Also where the impact energy absorber 32 incorporates therein the base plate 31, since a rivet 30 that can be sheared is used for securing the spacer 24 to the base plate 31, when an impact force is applied to the horn pad 22, the rivet 30 is sheared (in which case the easily-breakable retaining leg 24e is also broken), so that the connection between the upper plate portion 33 (the base plate 31) of the impact energy absorber 32 and the steering wheel body 21 is broken even though the spacer 24 is connected to the steering wheel body 21 through the tubular portion 24b, and as a result a deformation portion 36 can be easily buckled and deformed, thereby effectively absorbing the energy of the impact force. Where the horn switches 23 of a compact construction are arranged at the outer peripheral portion of the horn pad 22 as in this embodiment, a large space can be obtained below the central portion of the horn pad 22. Therefore even when an impact force acts on the central portion of the horn pad 22, since the horn switches 23 do not affect the deformation portion 36 of the impact energy absorber 32, such portion can absorb substantially all of the energy of the impact force, thus enhancing an energy absorbing efficiency of the impact energy absorber 32.

In this embodiment, although the horn spring 25 and the tongue 26 are retained on the spacer 24 by their respective pawls 25f and 26f, another retaining approach can alternatively be used. For example, thermal caulking can be employed, in which mounting projections are formed on the base plate 24a of the spacer 24, and these mounting projections are inserted into the mounting through holes formed in the horn spring 25 and the tongue 26, and then projected distal ends of these mounting projections are expanded. Alternatively, the spacer 24 may be molded to directly incorporate the horn spring 25 and the tongue 26 therein as molded inserts.

Figure 6:
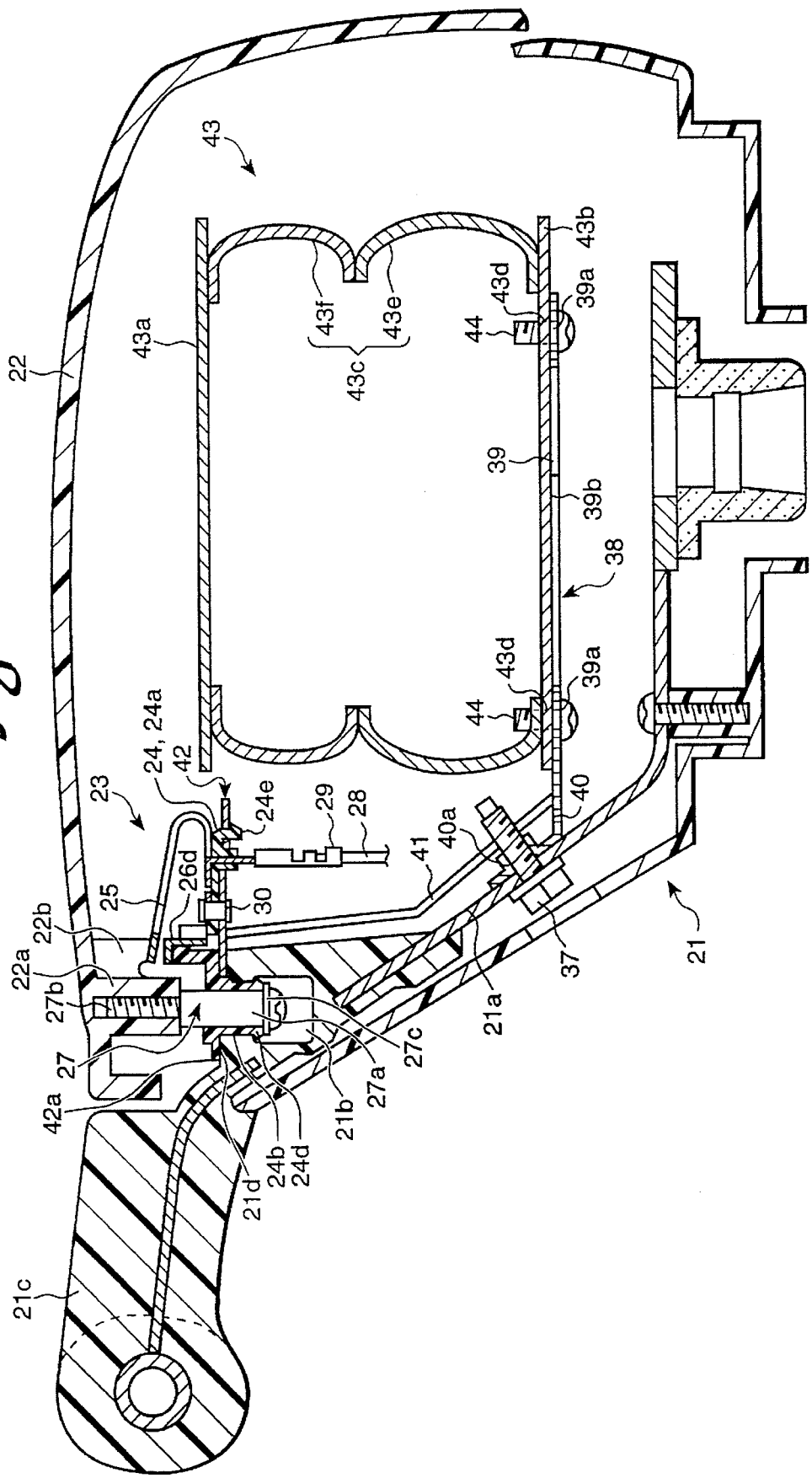
FIG. 6 is a cross-sectional view of another embodiment of a steering wheel of the present invention.

Another embodiment is described hereinafter with referring to FIGS. 6 and 7. The general arrangement of this embodiment is substantially similar to that shown in FIG. 1 except for an impact energy absorber and a supporting bracket therefor. Therefore, the following description is mainly directed to the difference there-between. The supporting bracket 38 for the horn switch 23 is made of metal sheet and as shown in FIG. 6, includes a bottom 39, three mounting portions 40 (only one is shown), three arms 41 (only one is shown), and three supporting stages 42 (only one is shown).

The bottom 39 is provided with mounting holes 39a through which an impact energy absorber 43 which will be described later in detail is mounted on the bottom 39 by means of bolts 37. The bottom 39 is also provided at a center portion thereof with a lightening hole 39b so as to be readily deformed. Accordingly, the bottom 39 presents a triangle frame shape.

The mounting portions 40 extend from the bottom 39, through which the supporting bracket 38 is mounted on the steering wheel body 21. The mounting portion 40 is fixedly screwed onto the metal core member 21a of the steering wheel body 21 by means of the bolt 37 which engages with a threaded portion 40a formed in the mounting portion 40. The mounting portion 40 is made by punching out and bending up one end part of the arm 41.

Three arms 41 extend from the respective vertex portions of the triangle shaped bottom 39 to the corresponding horn switches 23.

Figure 7:
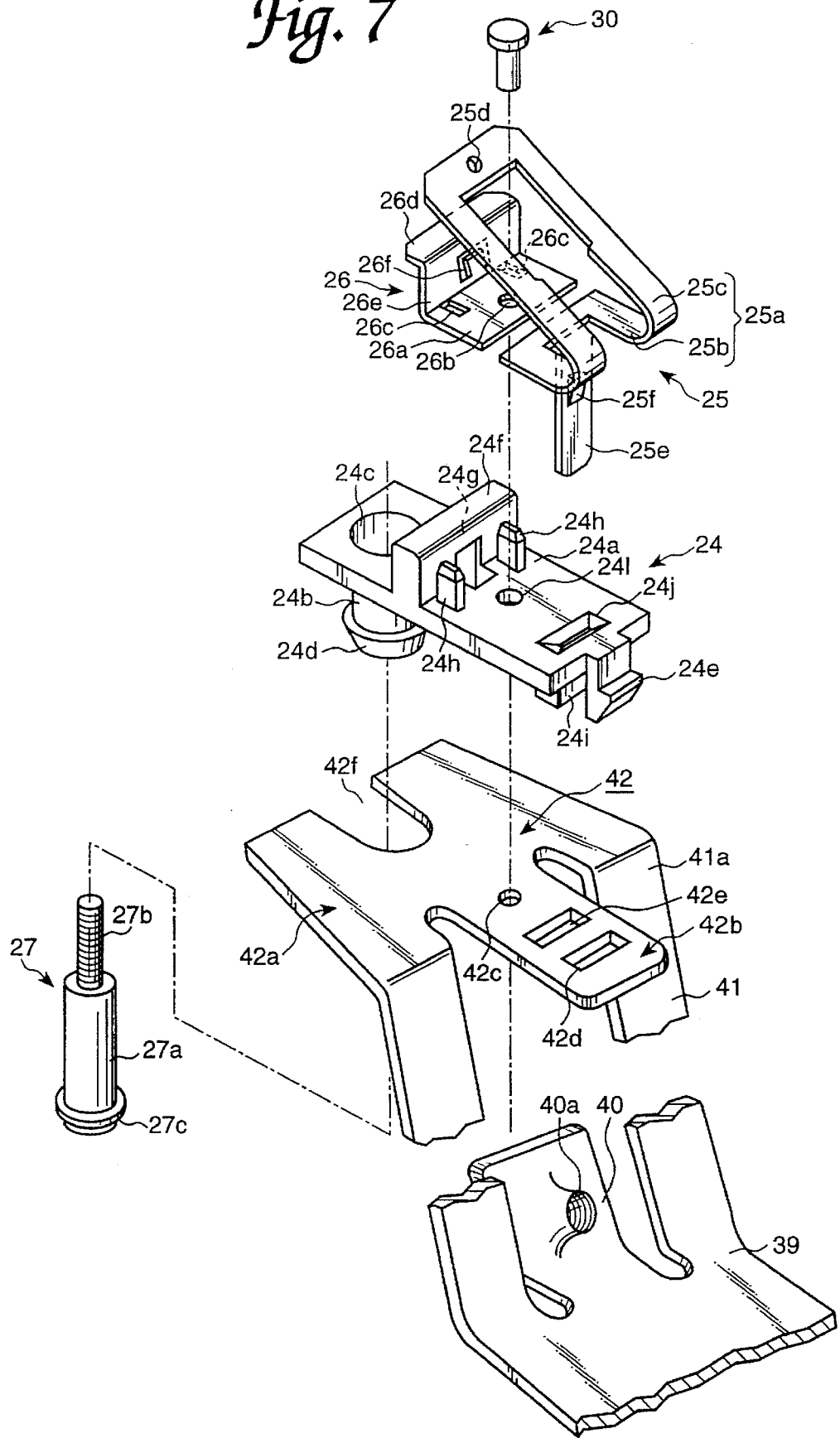
FIG. 7 is an exploded, perspective view of a horn switch of the steering wheel shown in FIG. 6.

As clearly shown in FIG. 7, the supporting stage 42 is divided into a radially outer part 42a and a radially inner part 42b by a border line along which an end 41a of the arm 41 is integrated into the supporting stage 42. The supporting stage 42 is made by partially punching and bending the other end part of the arm 41.

When the mounting portions 40 are fixedly screwed onto the metal core members 21a of the steering wheel body 21 by means of the bolts 37, the outer parts 42a of the supporting stages 42 are abutted onto supporting flats 21d of the steering wheel body 21 while the inner parts 42b extend radially inward and are free from the metal core members 21a and the supporting flats 21d of the steering wheel body 21.

The outer part 42a of the mounting portion 40 is provided with a notch 42f for receiving the tubular portion 24b of the spacer 24.

The inner part 42b of the mounting portion 40 is provided with a circular through hole 42c for the rivet 30, a rectangular through hole 42d engaged with the retaining leg 24e of the spacer 24 for temporally retaining the spacer 24 on the supporting stage 42, and a rectangular through hole 42e into which the mounting projection 24i is inserted.

The impact energy absorber 43 is made of metal sheet, and includes an upper plate portion 43a, a lower plate portion 43b, and a deformable portion 43c inter-connecting the plate portions 43a and 43b. The lower plate portion 43b is provided with threaded portions 43d which correspond to the mounting holes 39a of the bottom 39. The impact energy absorber 43 is fixedly mounted on the bottom 39 by tightening up bolts 44.

The deformable portion 43c includes a plastically deformable part 43e and a readily plastically deformable part 43f, whose thicknesses are difference from each other so as to effectively absorb an impact force regardless of an magnitude thereof. In case of the same thickness in these parts 43e and 43f, it may be possible to provide a larger lightening hole to the readily plastically deformable part 43f so as to make it more deformable than the deformable part 43e.

Figure 8:
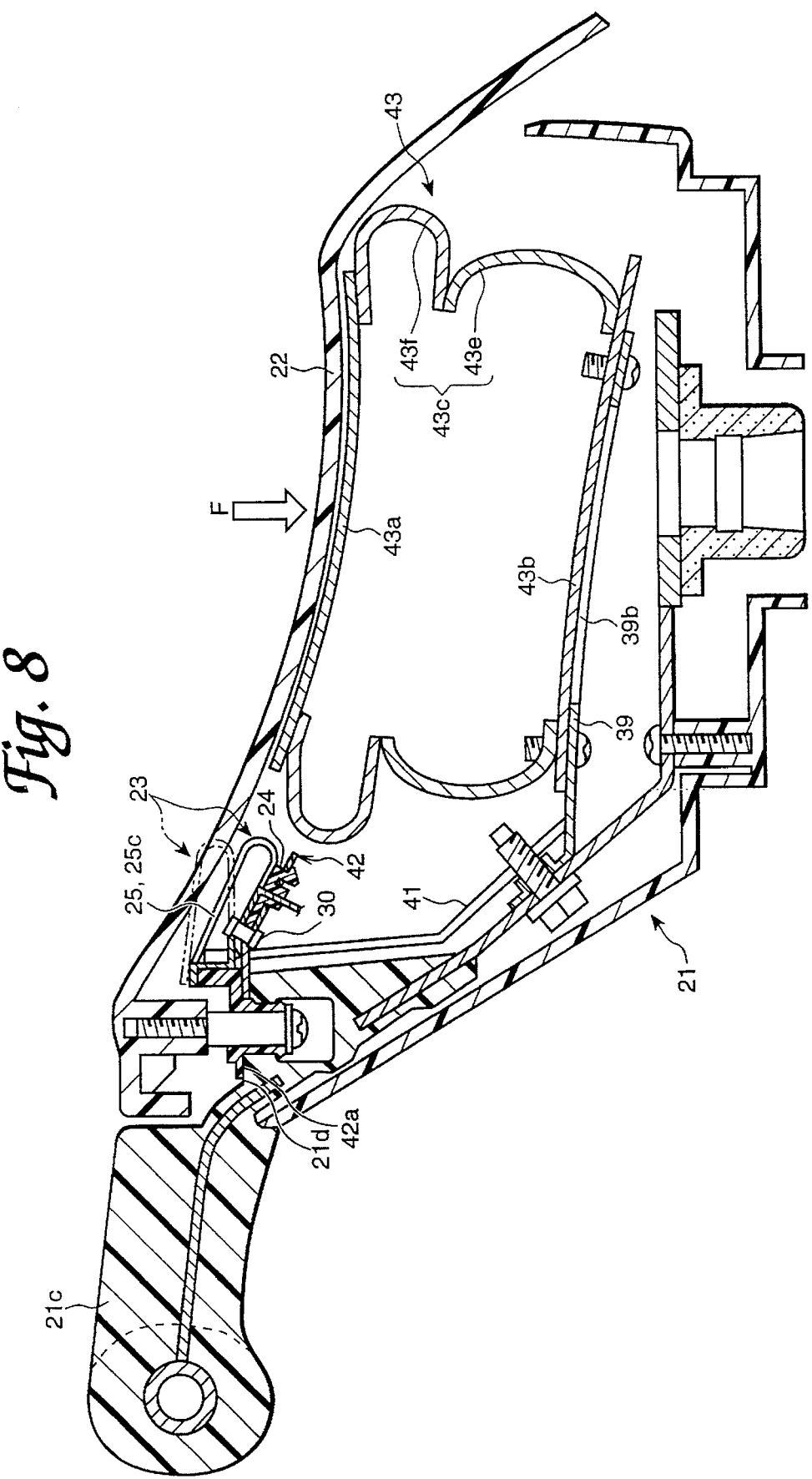
FIG. 8 is a cross-sectional view of the steering wheel shown in FIG. 6 when an impact force is applied to a horn pad.

When an impact force F is applied to a centre portion of the horn pad 22, as shown in FIG. 8, since the bottom 39 is provided with the lightening hole 39b, the bottom 39 is so readily deformed that the impact energy absorber 43 is also deformed to absorb an energy of the impact force F. When a lower higher impact force is applied, the readily plastically deformable part 43f is deformed to absorb it. When a higher impact force is applied, not only the readily plastically deformable part 43f but also the plastically deformable part 43e is deformed to absorb it. Accordingly, the impact energy absorber 43 can absorb the impact force of wider range of magnitude thereof.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A steering wheel comprising:
   a steering wheel body;
   a horn pad provided above said steering wheel body; and
   a plurality of horn switches forming part of a horn operating circuit, provided between said horn-pad and said steering wheel body;
   wherein each of said horn switches comprises an insulating spacer, a horn spring electrically connected to one electrode of said horn operating circuit, said horn spring being in contact with said horn pad to urge said horn pad upwardly, a tongue electrically connected to another electrode of said horn operating circuit, said tongue having a contact portion disposed beneath said contact portion of said horn spring, and a shoulder bolt screw-mounted to said horn pad;
   said spacer including a tubular portion having an enlarged portion formed on an outer peripheral surface thereof at a distal end thereof;
   said shoulder bolt including an axially extending shank which passes through said tubular portion, said shank being longer than said tubular portion, an externally-threaded portion which extends from one end of said shank and being screw-mounted to said horn pad, and a head which is provided at another end of said shank, said head having a diameter larger than an inner diameter of said tubular portion;
   said horn spring and said tongue are mounted on said spacer in an insulated manner, and said tubular portion is retained in a retaining hole provided in said steering wheel body, and said shoulder bolt is inserted into said tubular portion from an end thereof opposite to said horn pad.

2. A steering wheel according to claim 1, in which said spacer is fixedly mounted on a base plate comprised of a metal sheet and said base plate constitutes part of said horn operating circuit.

3. A steering wheel according to claim 2, in which said base plate constitutes part of an impact energy absorber.

4. A steering wheel according to claim 3, wherein said spacer is mounted by a rivet that can be sheared to said base plate.

5. A steering wheel according to claim 1, in which said spacer is fixedly mounted on a supporting stage of a plurality of supporting stage comprised of a metal sheet and said supporting stage constitutes part of said horn operating circuit.

6. A steering wheel according to claim 5, in which said supporting stage constitutes part of a supporting bracket for an impact energy absorber.

7. A steering wheel according to claim 6, in which said supporting bracket includes a bottom, a plurality of mounting portions extending from said bottom, fixed to said steering wheel body, a plurality of arms extending from said bottom to respective said horn switches, and said plurality of supporting stages each connected to respective said arms.

8. A steering wheel according to claim 7, in which said bottom includes mounting holes through which said impact energy absorber is fixed mounted onto said bottom, and a lightening hole.

9. A steering wheel according to claim 3, in which said impact energy absorber includes an upper plate portion, a lower plate portion, and a deformable portion interconnecting said portions.

* * * * *